US012595684B2

(12) United States Patent
Chen et al.

(10) Patent No.: US 12,595,684 B2
(45) Date of Patent: Apr. 7, 2026

(54) ELECTRONIC DOOR LOCK WITH UP-PUSHED LOCKING

(71) Applicant: TLHM CO., LTD., Chiayi City (TW)

(72) Inventors: Po-Yang Chen, Chiayi City (TW); Chia-Hung Yen, Chiayi City (TW)

(73) Assignee: TLHM CO., LTD., Chiayi City (TW)

( * ) Notice: Subject to any disclaimer, the term of this patent is extended or adjusted under 35 U.S.C. 154(b) by 357 days.

(21) Appl. No.: 18/319,582

(22) Filed: May 18, 2023

(65) Prior Publication Data

US 2023/0417081 A1 Dec. 28, 2023

(30) Foreign Application Priority Data

Jun. 27, 2022 (TW) ................................ 111206799

(51) Int. Cl.
*E05B 47/00* (2006.01)

(52) U.S. Cl.
CPC .. *E05B 47/0012* (2013.01); *E05B 2047/0093* (2013.01)

(58) Field of Classification Search
CPC ......... E05B 47/0012; E05B 2047/0093; E05B 2063/0086
USPC .......................................................... 292/216
See application file for complete search history.

(56) References Cited

U.S. PATENT DOCUMENTS 6,302,456 B1 * 10/2001 Errani ..................... E05B 59/00 70/109
6,651,287 B2 * 11/2003 Oikawa ................... B08B 1/143 15/88.2
9,890,565 B2 * 2/2018 Shiu ......................... E05B 63/08
10,890,020 B2 * 1/2021 Moon ...................... E05B 59/00
11,408,207 B2 * 8/2022 Liu ........................ E05B 15/022
2006/0123859 A1 * 6/2006 Gonzalez ................ E05B 59/00 70/107
2011/0175373 A1 * 7/2011 Ding ................... E05B 47/0012 292/144
2020/0157847 A1 * 5/2020 Liu ......................... E05B 55/12
2020/0157850 A1 * 5/2020 Liu ......................... E05C 9/026

FOREIGN PATENT DOCUMENTS

CA 2695602 A1 * 9/2010 .............. A61P 31/14
CN 110714662 B * 7/2021 ......... E05B 47/0001

* cited by examiner

*Primary Examiner* — Kristina R Fulton
*Assistant Examiner* — James Edward Ignaczewski
(74) *Attorney, Agent, or Firm* — Studebaker Brackett PLLC

(57) ABSTRACT

An electronic door lock with up-pushed locking is provided and includes a housing, a fixed latch assembly assembled in the housing, a linkage member and a first driving member. The first driving member is linked with an outer handle located outside a door. When a user lifts the outer handle, the first driving member is pulled to drive the linkage member, so that the linkage member abuts against a protruding rod located at a rear end of the fixed latch assembly, thereby pushing the fixed latch assembly to actuate, so that a fixed latch head of the fixed latch assembly protrudes out of the housing and the electronic door lock is locked. Accordingly, the problem that the user must use a key to lock the electronic door lock when the user is outside the door can be solved.

10 Claims, 3 Drawing Sheets

ELECTRONIC DOOR LOCK WITH UP-PUSHED LOCKING

BACKGROUND

1. Technical Field

The present disclosure relates to an electronic door lock, and more particularly, to an electronic door lock with up-pushed locking.

2. Description of Related Art

Traditional door locks that use keys for unlocking have the problem that the keys are easy to copy or lose, and it is quite inconvenient to use keys to unlock. Furthermore, people with picklocks or unlocking technology can easily unlock traditional door locks. Therefore, there is a problem of poor security.

Nowadays, electronic door locks have been developed, that is, electronic door locks that can be unlocked via chip keys or passwords have been developed. As compared with the traditional door locks, electronic door locks incorporate electronic drive devices and sensors into the existing mechanical structures to provide automatic unlocking and identification functions via the electronic drive devices, so that users can open the door locks via chip keys or passwords without relying on the keys. Furthermore, the electronic door locks can determine the state of the electronic door locks via the setting of the sensors, so as to issue warnings to notify the users when faults occur or the door locks are illegally opened. Therefore, electronic door locks are more convenient and safer than traditional door locks.

However, the existing electronic door lock only provides the function of unlocking the door with a chip key or a password when the user is outside the door. In other words, the existing electronic door lock has the problem that it cannot be quickly locked from the outside of the door. For instance, if the user outside the door wants to lock the electronic door lock, the user must still use the key to lock the electronic door lock outside the door, that is, the user still needs to carry the key when going out, which loses the convenience of the electronic door lock and also cannot meet the requirement of fast locking, such that the existing electronic door lock is still quite inconvenient to use.

In light of the above, there is a need in the art to provide an electronic door lock with the function of locking the electronic door lock outside the door without using a key so as to improve the convenience of using the electronic door lock.

SUMMARY

In view of the aforementioned shortcomings of the prior art, the present disclosure provides an electronic door lock with up-pushed locking, which comprises: a housing; a fixed latch assembly comprising a driving unit movably arranged in the housing, a fixed latch head connected to a front end of the driving unit, and a protruding rod arranged at a rear end of the driving unit; a linkage member rotatably arranged on a fixed shaft of the housing and having a rotated-swing end and a pushing end for pushing the protruding rod; and a first driving member rotatably arranged on a rotating shaft of the housing and having a push-swing end for pushing the rotated-swing end, wherein the rotating shaft of the housing is connected with an outer handle simultaneously, the first driving member is linked with the outer handle, such that the first driving member is pulled to drive the linkage member to swing when the outer handle is lifted, thereby pushing the fixed latch assembly to actuate, so as to move the fixed latch head to a locking position.

In one embodiment, a portion of the push-swing end corresponding to the rotated-swing end is an arc surface, so that when the rotated-swing end is pushed, the rotated-swing end is slid on the arc surface.

In another embodiment, the electronic door lock with up-pushed locking of the present disclosure further comprises a base sleeving outside the rotating shaft and restricting a rotation range of the first driving member.

In another embodiment, the base comprises a first block and a second block, and the first driving member is located between the first block and the second block.

In another embodiment, the electronic door lock with up-pushed locking of the present disclosure further comprises a second driving member rotatably arranged on the rotating shaft, wherein the first driving member and the second driving member are arranged on two opposite surfaces of the base respectively, and the second driving member is linked with the first driving member.

In another embodiment, the first driving member has a connecting groove, and the second driving member has a connecting sheet extending toward and assembled in the connecting groove.

In another embodiment, the base has an upper blocking surface and a lower blocking surface corresponding to the connecting sheet, and the connecting sheet is located between the upper blocking surface and the lower blocking surface to restrict a rotation range of the second driving member.

In another embodiment, the electronic door lock with up-pushed locking of the present disclosure further comprises: a movable latch assembly arranged in the housing and comprising a movable member, a movable latch head bonded to a front end of the movable member and protruding out of the housing, and a toggle member bonded to a rear end of the movable member; a telescopic rod arranged in the movable member and corresponding to the toggle member, wherein the telescopic rod has an abutting surface; a driving assembly arranged in the housing; and an elastic member arranged in the housing, wherein the driving assembly and the toggle member are connected to two ends of the elastic member respectively, wherein the first driving member has a push block corresponding to the abutting surface, the telescopic rod is driven by the toggle member to extend out or retract into the movable member when the driving assembly moves the toggle member via the elastic member, the abutting surface of the telescopic rod is abutted against by the push block when the telescopic rod is extended to expose the abutting surface from the movable member, and the push block is free from being in contact with the abutting surface of the telescopic rod when the telescopic rod is retracted back into the movable member.

In another embodiment, the electronic door lock with up-pushed locking of the present disclosure further comprises a fixed latch sensor arranged in the housing and corresponding to the fixed latch assembly, wherein the fixed latch sensor is used for sensing a state of the fixed latch assembly.

In yet another embodiment, the electronic door lock with up-pushed locking of the present disclosure further comprises: an anti-theft latch assembly comprising a touch member movably arranged in the housing, an anti-theft latch connected to the touch member, and a touch rod disposed corresponding to the touch member, wherein the anti-theft latch drives the touch rod via the touch member during closing or opening of a door; and an anti-theft latch sensor arranged in the housing and corresponding to the anti-theft latch assembly, wherein the anti-theft latch sensor is used for sensing a position of the touch rod to determine a state of the anti-theft latch assembly.

In view of the above, the electronic door lock with up-pushed locking of the present disclosure can provide the user to drive the first driving member to push the linkage member by lifting the outer handle when the user is outside the door, so that when the linkage member is forced to swing, the purpose of locking the electronic door lock can be achieved by pushing the protruding rod of the fixed latch assembly to move the fixed latch assembly to a locked state, so that the user can quickly lock the electronic door lock without using a key, which improves the convenience of using the electronic door lock.

DETAILED DESCRIPTION

Implementations of the present disclosure are described below by embodiments. Other advantages and technical effects of the present disclosure can be readily understood by one of ordinary skill in the art upon reading the disclosure of this specification.

Figure 1:
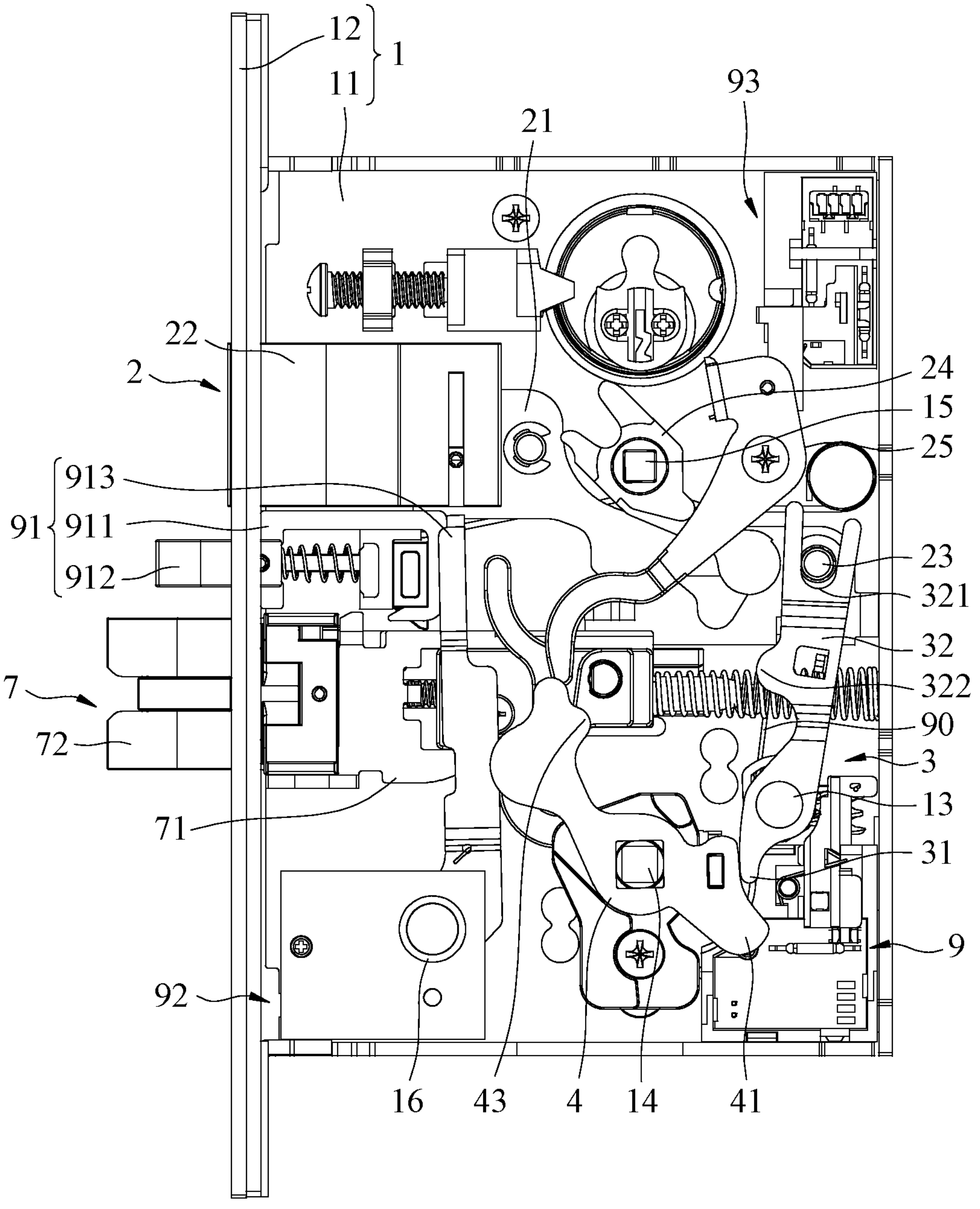
FIG. 1 is a schematic diagram of the structure of an electronic door lock with up-pushed locking according to the present disclosure.

FIG. 1 is a schematic diagram of the structure of an electronic door lock with up-pushed locking (e.g., lift locking) according to the present disclosure. As shown in FIG. 1, the electronic door lock with up-pushed locking of the present disclosure comprises a housing 1, a fixed latch assembly 2, a linkage member 3 and a first driving member 4 disposed in the housing 1. A user pulls/turns the first driving member 4 by lifting an outer handle of the electronic door lock, so that the first driving member 4 drives the linkage member 3 to swing, and then pushes the fixed latch assembly 2 to move to a locked position, thereby providing a function of up-pushed locking. Detailed descriptions of the present disclosure are described below.

The housing 1 has an accommodation space 11 for accommodating the fixed latch assembly 2, the linkage member 3 and the first driving member 4, and a panel 12 arranged on one side of the housing 1; in addition, the housing 1 further has a plurality of guiding grooves for guiding the movement of the fixed latch assembly 2 and a fixed shaft 13 and a rotating shaft 14 for arranging the linkage member 3 and the first driving member 4 respectively, wherein the rotating shaft 14 of the housing 1 is provided for connecting an outer connecting rod (not shown) of the outer handle penetrating from the outside of the door with the first driving member 4, so that the first driving member 4 can be linked with the outer handle and rotate on the rotating shaft 14. In addition, the rotating shaft 14 of the housing can be used for an inner connecting rod of an inner handle to penetrate from the inside of the door.

The fixed latch assembly 2 comprises a driving unit 21 movably arranged in the housing 1, a fixed latch head 22 connected to a front end of the driving unit 21, and a protruding rod 23 disposed at a rear end of the driving unit 21. For example, the driving unit 21 can use two guiding rods that are respectively arranged in the corresponding guiding grooves in a slidable manner so as to guide a movement of the fixed latch assembly 2, thereby driving the fixed latch head 22 to extend out from outside of the housing 1 to be in a fastened (or locked) state, or driving the fixed latch head 22 to retract into the housing 1 to be in an unlocked state.

In one embodiment, the fixed latch assembly 2 further comprises a swing member 24 swingably arranged on a swing shaft 15 of the housing 1 and a transmission rod 25 swingably arranged in the housing 1. Accordingly, the swing member 24 and the transmission rod 25 are driven by the driving unit 21 to swing when the driving unit 21 moves. For instance, during a movement of the driving unit 21 to the unlocked state (i.e., moves to the right in FIG. 1), the swing member 24 is driven by the driving unit 21 to swing counterclockwise, and the transmission rod 25 is pushed by the swing member 24 to also swing in a counterclockwise direction. In addition, during a movement of the driving unit 21 to the locked state (i.e., moves to the left in FIG. 1), the swing member 24 is driven by the driving unit 21 to swing clockwise, and the transmission rod 25 is pushed by the swing member 24 to swing in a clockwise direction. Moreover, the user can also rotate the swing member 24 via a turn button located inside the door/house to drive the driving unit 21 to move to the unlocked state or the locked state. In one embodiment, the present disclosure may further comprise a fixed latch sensor 93 arranged in the housing 1 and corresponding to the fixed latch assembly 2, wherein the fixed latch sensor 93 senses whether the fixed latch assembly 2 is in an unlocked state or a locked state. For instance, the fixed latch sensor 93 is in contact with or connected to the transmission rod 25 of the fixed latch assembly 2, so that the fixed latch sensor 93 can determine the state of the fixed latch assembly 2 by sensing a swing position of the transmission rod 25. For example, the fixed latch assembly 2 is sensed by the fixed latch sensor 93 as in the unlocked state when the transmission rod 25 swings counterclockwise to a fixed point, and the fixed latch assembly 2 is sensed by the fixed latch sensor 93 as in the locked state when the transmission rod 25 swings clockwise to another fixed point.

The linkage member 3 is rotatably arranged on the fixed shaft 13 of the housing 1, and has a rotated-swing end 31 and a pushing end 32 for pushing the protruding rod 23. In one embodiment, as shown in FIG. 1, the rotated-swing end 31 and the pushing end 32 extend from the fixed shaft 13 to two opposite sides respectively, so that the pushing end 32 extends to the protruding rod 23, wherein the pushing end 32 comprises an elongated groove 321 provided for arranging the protruding rod 23 inside the groove 321, so that the protruding rod 23 may move in the groove 321 when the protruding rod 23 is pushed by the pushing end 32.

The first driving member 4 is rotatably disposed on the rotating shaft 14 of the housing, and has a push-swing end 41 being in contact with or connected to the rotated-swing end 31 to push the rotated-swing end 31. In one embodiment, a portion of the push-swing end 41 corresponding to the rotated-swing end 31 is an arc surface, and the rotated-swing end 31 can be pushed to swing via the arc surface, that is, the rotated-swing end 31 can slide on the arc surface.

In practice, when the user lifts the outer handle outside the door, that is, rotates the outer handle upward, the first driving member 4 will be linked to rotate, so that the push-swing end 41 pushes the rotated-swing end 31 to swing, that is, when the linkage member 3 is driven by the first driving member 4 to swing, the linkage member 3 can push the protruding rod 23 to move the fixed latch assembly 2 after being forced to rotate, so that the fixed latch head 22 protrudes to the outside of the housing 1 via the panel 12, and the fixed latch assembly 2 is in a locked state, thereby achieving the purpose of up-pushed locking. Therefore, when the user is outside the door, the electronic door lock can be locked without using the key.

Figure 2A:
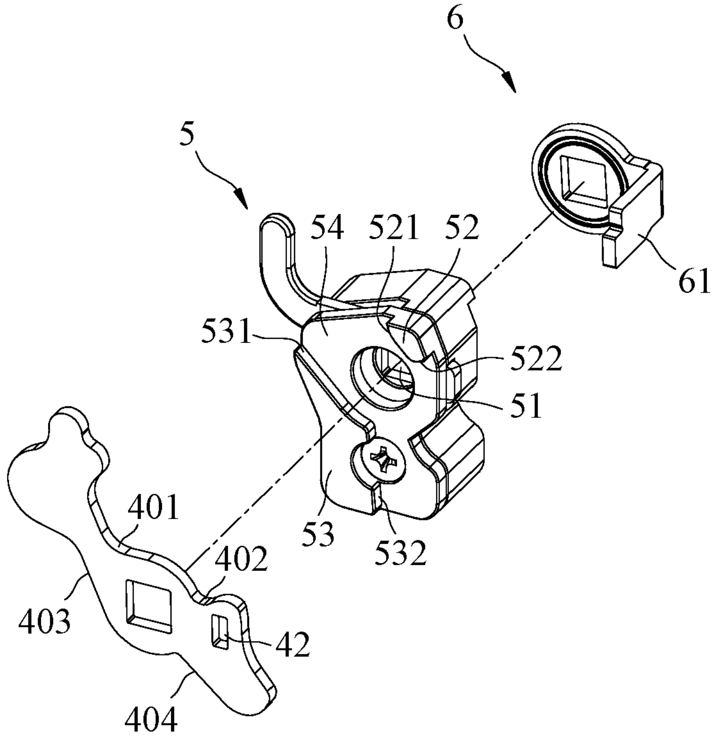
FIG. 2A and FIG. 2B are schematic perspective diagrams of driving members and a base of the electronic door lock with up-pushed locking according to the present disclosure.
Figure 2B:
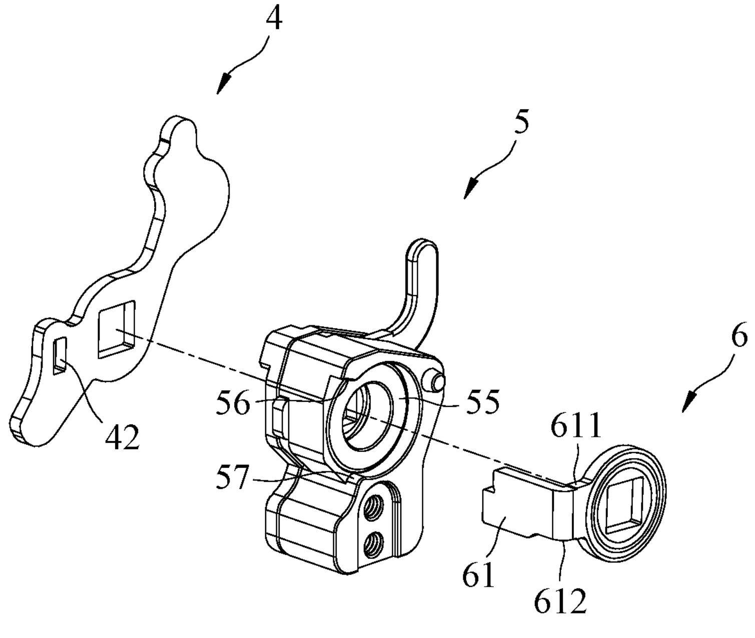

FIG. 2A and FIG. 2B are schematic perspective diagrams of driving members and a base of the electronic door lock with up-pushed locking according to the present disclosure. As shown in FIG. 2A and FIG. 2B, and please also refer to FIG. 1, the electronic door lock with up-pushed locking of the present disclosure further comprises a base 5 and a second driving member 6, wherein the first driving member 4 and the second driving member 6 are arranged on two opposing surfaces of the base 5 respectively, which is detailed below.

The base 5 has an installation hole 51 provided for the penetration of the rotating shaft 14 and sleeving on the rotating shaft 14, and the rotation range of the first driving member 4 is restricted/limited by the base 5. For instance, the base 5 comprises a first block 52 and a second block 53 arranged on the front surface, so that the first driving member 4 is arranged on a front surface 54 and located between the first block 52 and the second block 53. For example, the first block 52 has a first blocking surface 521 and a second blocking surface 522, and the second block 53 has a third blocking surface 531 corresponding to the first blocking surface 521 and a fourth blocking surface 532 corresponding to the second blocking surface 522, while the first driving member 4 has a first resisting surface 401, a second resisting surface 402, a third resisting surface 403 and a fourth resisting surface 404 corresponding to the first blocking surface 521, the second blocking surface 522, the third blocking surface 531 and the fourth blocking surface 532 respectively, that is, the first resisting surface 401 and the fourth resisting surface 404 are resisted by the first blocking surface 521 and the fourth blocking surface 532 when the first driving member 4 is driven by pressing down the outer handle, also the second resisting surface 402 and the third resisting surface 403 are resisted by the second blocking surface 522 and the third blocking surface 531 when the outer handle is lifted. Accordingly, the purpose of limiting movement of the first driving member 4 can be achieved, such that the failure of the electronic door lock caused by the excessive rotation of the first driving member 4 can be avoided.

In addition, a rear surface 55 relative to the front surface 54 of the base 5 further comprises an upper blocking surface 56 and a lower blocking surface 57 for limiting movement of the second driving member 6, which is detailed below.

The second driving member 6 is also arranged on the rotating shaft 14 and can be rotated on the rotating shaft 14, and is connected to the inner connecting rod of the inner handle. As shown in FIG. 2A and FIG. 2B, the second driving member 6 and the first driving member 4 are arranged on two opposite surfaces (i.e., the front surface 54 and the rear surface 55) of the base 5 respectively to be linked with each other. In one embodiment, the first driving member 4 has a connecting groove 42, and the second driving member 6 has a connecting sheet 61 extending to and capable of being assembled in the connecting groove 42. Accordingly, the second driving member 6 is assembled in the connecting groove 42 via the connecting sheet 61 so as to be linked with the first driving member 4. In other words, the second driving member 6 is arranged on the rear surface 55 of the base 5, and the connecting sheet 61 is located between the upper blocking surface 56 and the lower blocking surface 57. Therefore, the base 5 can restrict/limit the rotation range of the second driving member 6 via the upper blocking surface 56 and the lower blocking surface 57, and the connecting sheet 61 has an upper resisting surface 611 and a lower resisting surface 612 corresponding to the upper blocking surface 56 and the lower blocking surface 57 respectively, so that the upper resisting surface 611 of the second driving member 6 will be resisted by the upper blocking surface 56 when the inner handle is lifted to rotate the second driving member 6, and the lower resisting surface 612 will be resisted by the lower blocking surface 57 when the inner handle is pressed down to rotate the second driving member 6. Accordingly, the purpose of limiting movement of the second driving member 6 can be achieved, such that the failure of the electronic door lock caused by the excessive rotation of the second driving member 6 can be avoided.

In view of the above, the user inside the door can drive the second driving member 6 to rotate by lifting the inner handle (i.e., turning the inner handle upward), and the first driving member 4 is rotated by the connecting sheet 61. When the first driving member 4 rotates, the push-swing end 41 can be used to push the rotated-swing end 31 to swing the linkage member 3, thereby pushing the fixed latch assembly 2 to move, so that the fixed latch head 22 protrudes to the outside of the housing 1, which achieves the purpose of lifting the handle to lock the electronic door lock.

Figure 3:
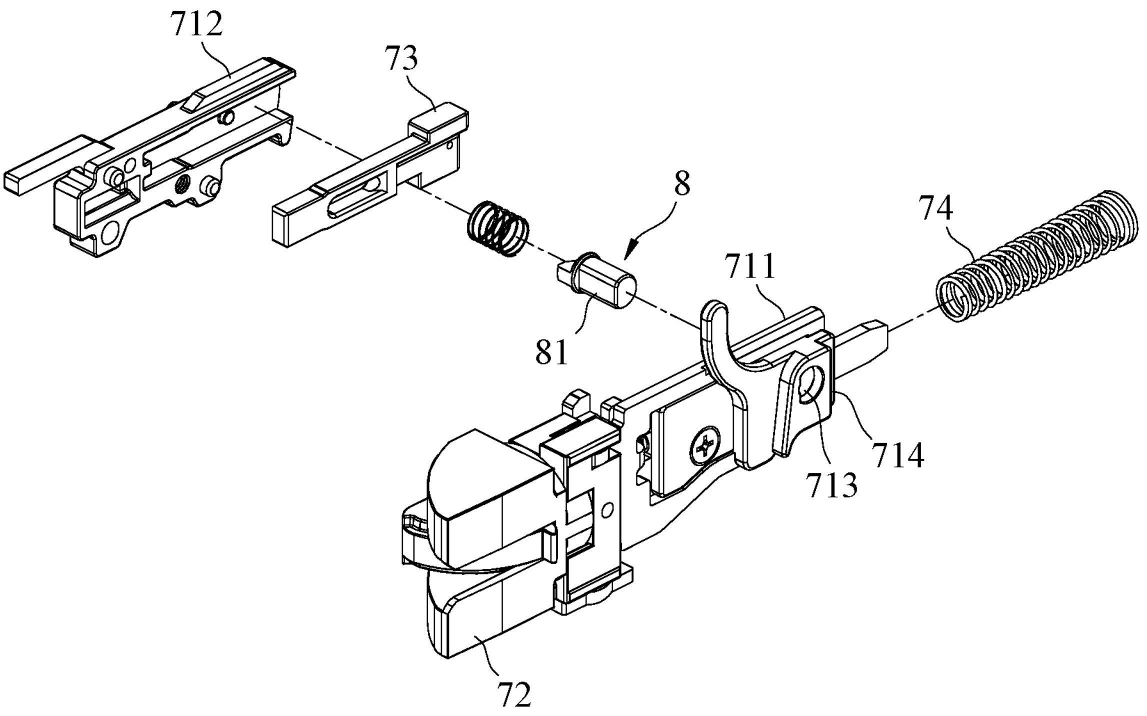
FIG. 3 is a schematic perspective diagram of a movable latch assembly of the electronic door lock with up-pushed locking according to the present disclosure.

FIG. 3 is a schematic perspective diagram of a movable latch assembly of the electronic door lock with up-pushed locking according to the present disclosure. As shown in FIG. 3, and also please refer to FIG. 1, the electronic door lock with up-pushed locking according to the present disclosure comprises a movable latch assembly 7, a telescopic rod 8, a driving assembly 9 and an elastic member 90. Details are described below.

The movable latch assembly 7 is disposed in the housing 1 and comprises a movable member 71, a movable latch head 72 bonded to a front end of the movable member 71 and protruding outside the housing 1, a toggle member 73 bonded to a rear end of the movable member 71, and a spring 74 located between the rear end of the movable member 71 and an inner side of the housing 1 to provide the elastic force for the movable member 71. For instance, the movable member 71 has a front housing 711 and a rear housing 712, and the front housing 711 and the rear housing 712 are combined to form a movable space for the toggle member 73 to be arranged, so that the toggle member 73 can be displaced relative to the movable member 71 in the movable space. In addition, the front housing 711 has a through hole 713 communicating with the movable space.

The telescopic rod 8 is disposed in the movable member 71 and corresponding to the toggle member 73, and has an abutting surface 81. For this, the first driving member 4 has a push block 43 corresponding to the abutting surface 81. As shown in FIG. 3, the telescopic rod 8 is movably disposed in the through hole 713 to extend out or retract into the movable member 71, so that when the telescopic rod 8 extends out of the movable member 71 to expose the abutting surface 81, the abutting surface 81 can be pushed by the first driving member 4 via the push block 43 to drive the movable latch assembly 7 to move, so that the movable latch head 72 is submerged into the housing 1.

The driving assembly 9 is disposed in the housing 1 and can drive the toggle member 73 to displace relative to the movable member 71 via the elastic member 90. In an embodiment, the driving assembly 9 comprises a drive motor (not shown) for providing power.

The elastic member 90 is disposed in the housing 1, and two ends of the elastic member 90 are connected to the driving assembly 9 and the toggle member 73 respectively, so that the driving assembly 9 can drive the toggle member 73 to displace via the elastic member 90. In an embodiment, the elastic member 90 can be a telescopic spring or a torsion spring.

Accordingly, when the elastic member 90 is driven by a power provided by the driving assembly 9, the toggle member 73 can be driven by the elastic member 90, so that the toggle member 73 drives the telescopic rod 8 to extend out from the movable member 71, or retract into the movable member 71. In practice, when the user does not hold the correct chip key or input the correct password, the driving assembly 9 cannot be activated to drive the toggle member 73. At this time, the telescopic rod 8 will remain retracted in the movable member 71, so that the push block 43 cannot push against the abutting surface 81 of the telescopic rod 8 retracted in the movable member 71, the user thus cannot open the door by pulling/turning the outer handle. On the contrary, when the user is outside the door and unlocks the electronic door lock via the correct chip key or password, the telescopic rod 8 will be extended and the abutting surface 81 will be exposed out from the movable member 71, at this time, the user may pull/turn the first driving member 4 by pulling/turning the outer handle outside the door, and the push block 43 will abut against the abutting surface 81 of the telescopic rod 8, so as to drive the movable latch assembly 7 to move to the right (the right side in FIG. 1) and drive the movable latch head 72 to submerge into the housing 1 and open the door.

In one embodiment, the movable member 71 may have a pushing surface 714 corresponding to the pushing end 32 of the linkage member 3, and a pushing block 322 is formed on the pushing end 32 opposing the pushing surface 714. Accordingly, when the movable latch assembly 7 moves to the right, the pushing surface 714 of the movable member 71 abuts against the pushing block 322, so that the linkage member 3 rotates to drive the fixed latch assembly 2 to the right via the protruding rod 23, and the fixed latch head 22 is submerged in the housing 1. Therefore, the user can directly drive the movable latch assembly 7 to the right via the outer handle when the fixed latch assembly 2 is in the locked state, so that the fixed latch assembly 2 is driven to switch to the unlocked state, and the user can directly complete the action of opening the door.

As shown in FIG. 1, in another embodiment, the present disclosure further comprises an anti-theft latch assembly 91 and an anti-theft latch sensor 92 as detailed below.

The anti-theft latch assembly 91 comprises a touch member 911 movably arranged in the housing 1, an anti-theft latch 912 connected to the touch member 911, and a touch rod 913 arranged corresponding to the touch member 911, so that the anti-theft latch 912 is submerged in the housing 1 when closing or opening the door to push the touch member 911 to swing the touch rod 913. As shown in FIG. 1, in an embodiment, the touch rod 913 is rotatably arranged on a rotated-swing shaft 16 of the housing 1 and comprises an upper end extending from the rotated-swing shaft 16 to the touch member 911 and a lower end extending to the anti-theft latch sensor 92.

The anti-theft latch sensor 92 is arranged in the housing 1 and corresponding to the anti-theft latch assembly 91, and is used for sensing the position of the touch rod 913 to determine the state of the anti-theft latch assembly 91, that is, the anti-theft latch sensor 92 is arranged in the housing 1 and corresponds to the touch rod 913 of the anti-theft latch assembly 91 to detect whether the door is currently closed based on whether the anti-theft latch sensor 92 is triggered by the lower end of the touch rod 913.

Therefore, when the user is about to close the door, the anti-theft latch 912 is pressed by a door frame and retracted into the housing 1 and drives the touch member 911 to abut against the upper end of the touch rod 913 to move backward (as shown in the right side of FIG. 1), and the lower end of the touch rod 913 swings toward the direction close to the anti-theft latch sensor 92 via the rotated-swing shaft 16 to trigger the anti-theft latch sensor 92, even if the anti-theft latch sensor 92 senses the touch rod 913. In contrast, when opening the door, the anti-theft latch 912 is released from the pressing of the door frame and protrudes out of the housing 1, which will drive the upper end of the touch rod 913 to move forward (the left side of FIG. 1), and drive the lower end of the touch rod 913 to swing to a direction away from the anti-theft latch sensor 92, so that the anti-theft latch sensor 92 is not triggered by the touch member 911. In short, whether the door is open or closed is determined by whether the anti-theft latch sensor 92 is triggered by the lower end of the touch rod 913.

In view of the above, in the electronic door lock with up-pushed locking of the present disclosure, the first driving member pushes the linkage member to swing when the user lifts the outer handle, so that the linkage member abuts against the protruding rod to cause the fixed latch assembly to move to the locked state, thereby achieving the purpose of lifting the handle for locking. Accordingly, the present disclosure enables the user to quickly lock the electronic door lock without the need of a key, so that the convenience of using the electronic door lock is improved.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. An electronic door lock with up-pushed locking, comprising:

a housing;

a movable latch assembly arranged in the housing;

a telescopic rod arranged in the movable latch assembly;

a fixed latch assembly comprising a driving unit movably arranged in the housing, a fixed latch head connected to a front end of the driving unit, and a protruding rod arranged at a rear end of the driving unit;

a linkage member rotatably arranged on a fixed shaft of the housing and having a rotated-swing end and a pushing end for pushing the protruding rod; and a first driving member rotatably arranged on a rotating shaft of the housing and having a push-swing end for pushing the rotated-swing end and a push block corresponding to the telescopic rod, wherein the first driving member is formed as one piece, and wherein the rotating shaft of the housing is connected with an outer handle simultaneously, the first driving member is linked with the outer handle, such that the first driving member is pulled to drive the linkage member to swing when the outer handle is lifted, thereby pushing the fixed latch assembly to actuate, so as to move the fixed latch head to a locking position.

2. The electronic door lock with up-pushed locking of claim 1, wherein a portion of the push-swing end corresponding to the rotated-swing end is an arc surface, so that when the rotated-swing end is pushed, the rotated-swing end is slid on the arc surface.

3. The electronic door lock with up-pushed locking of claim 1, further comprising a base sleeving outside the rotating shaft and restricting a rotation range of the first driving member.

4. The electronic door lock with up-pushed locking of claim 3, wherein the base comprises a first block and a second block, and the first driving member is located between the first block and the second block.

5. The electronic door lock with up-pushed locking of claim 3, further comprising a second driving member rotatably arranged on the rotating shaft, wherein the first driving member and the second driving member are arranged on two opposite surfaces of the base respectively, and the second driving member is linked with the first driving member.

6. The electronic door lock with up-pushed locking of claim 5, wherein the first driving member has a connecting groove, and the second driving member has a connecting sheet extending toward and assembled in the connecting groove.

7. The electronic door lock with up-pushed locking of claim 6, wherein the base has an upper blocking surface and a lower blocking surface corresponding to the connecting sheet, and the connecting sheet is located between the upper blocking surface and the lower blocking surface to restrict a rotation range of the second driving member.

8. The electronic door lock with up-pushed locking of claim 1, further comprising:

the movable latch assembly having a movable member, a movable latch head bonded to a front end of the movable member and protruding out of the housing, and a toggle member bonded to a rear end of the movable member;

the telescopic rod arranged in the movable member and corresponding to the toggle member, wherein the telescopic rod has an abutting surface;

a driving assembly arranged in the housing; and an elastic member arranged in the housing, wherein the driving assembly and the toggle member are connected to two ends of the elastic member respectively, wherein the push block is corresponding to the abutting surface, the telescopic rod is driven by the toggle member to extend out or retract into the movable member when the driving assembly moves the toggle member via the elastic member, the abutting surface of the telescopic rod is abutted against by the push block when the telescopic rod is extended to expose the abutting surface from the movable member, and the push block is free from being in contact with the abutting surface of the telescopic rod when the telescopic rod is retracted back into the movable member.

9. The electronic door lock with up-pushed locking of claim 1, further comprising a fixed latch sensor arranged in the housing and corresponding to the fixed latch assembly, wherein the fixed latch sensor is used for sensing a state of the fixed latch assembly.

10. The electronic door lock with up-pushed locking of claim 1, further comprising:

an anti-theft latch assembly comprising a touch member movably arranged in the housing, an anti-theft latch connected to the touch member, and a touch rod disposed corresponding to the touch member, wherein the anti-theft latch drives the touch rod via the touch member during closing or opening of a door; and an anti-theft latch sensor arranged in the housing and corresponding to the anti-theft latch assembly, wherein the anti-theft latch sensor is used for sensing a position of the touch rod to determine a state of the anti-theft latch assembly.

* * * * *